Oct. 7, 1930.  F. H. SANDHERR  1,777,860
TRANSMISSION
Filed March 31, 1926   4 Sheets-Sheet 1

Inventor:
F. H. Sandherr.
By Fred'k J. Larson
Attorney.

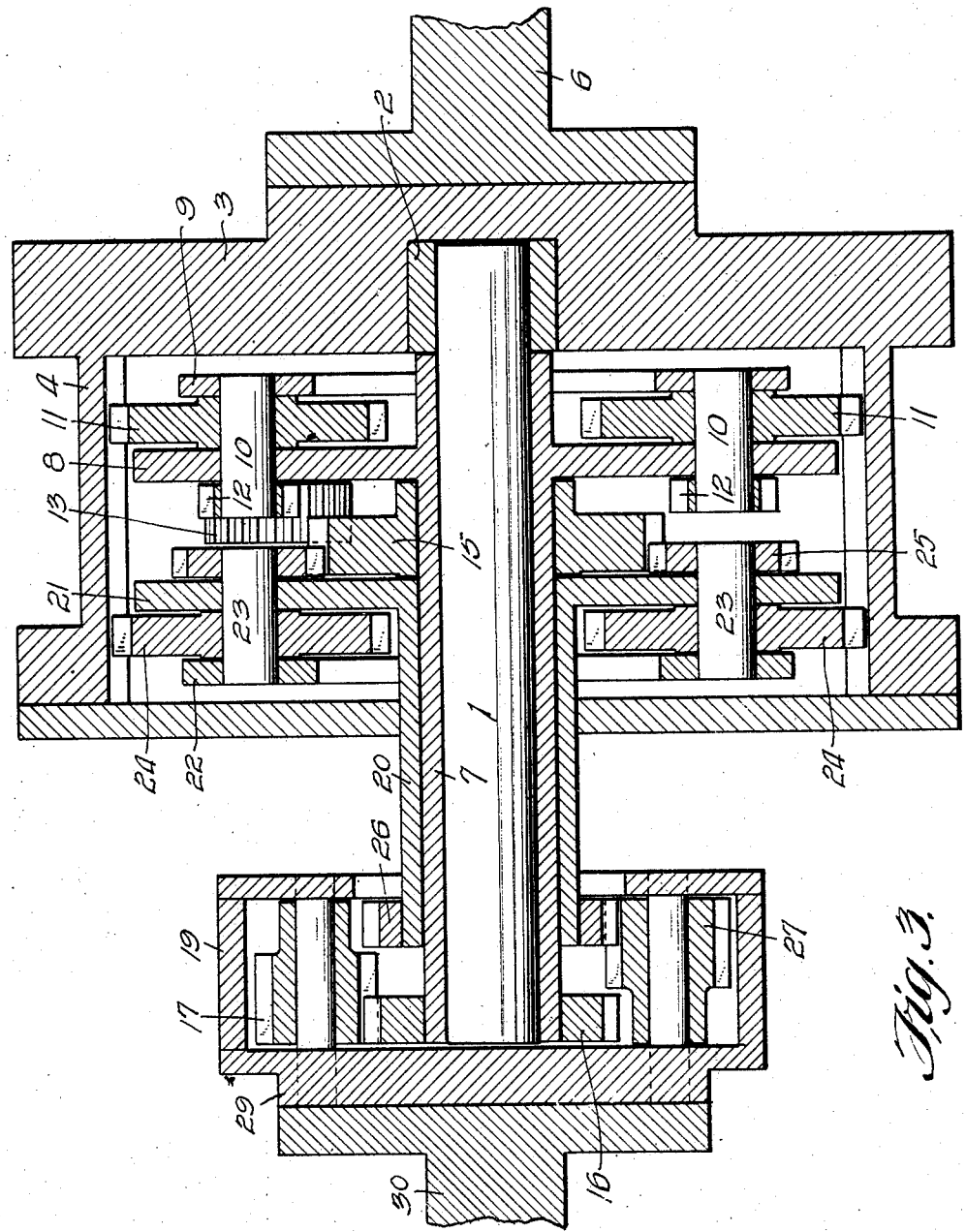

Oct. 7, 1930.  F. H. SANDHERR  1,777,860
TRANSMISSION
Filed March 31, 1926   4 Sheets-Sheet 3

Inventor:
F. H. Sandherr,
By Fred'k J. Larson
Attorney.

Oct. 7, 1930.                F. H. SANDHERR                1,777,860
                               TRANSMISSION
                          Filed March 31, 1926         4 Sheets-Sheet 4

Inventor:
F. H. Sandherr.

Patented Oct. 7, 1930

1,777,860

UNITED STATES PATENT OFFICE

FREDERICK H. SANDHERR, OF ST. LOUIS, MISSOURI, ASSIGNOR TO SANDHERR AUTOMATIC TRANSMISSIONS, INC., OF WILMINGTON, DELAWARE, A CORPORATION OF DELAWARE

TRANSMISSION

Application filed March 31, 1926. Serial No. 98,750.

My invention relates to a power transmission device, and, more particularly to a planetary gear transmission, and, it is a distinct and practical improvement to overcome certain practical objections to, and defects in the present types of power transmission devices.

The object of my present invention is the provision of a planet gear transmission device whereby any overloading of the engine is rendered impossible due to compensating mechanism which will automatically counteract variations in loads, or resistance offered the driving member at all times, and thereby automatically and progressively regulating the speed relations between a driving member and a driven member, and eliminating all jerks, shocks, or stresses when the device is put into operation and also eliminating the shifting lever now employed in sliding gear transmissions.

A further object of the invention is the provision of a revoluble internal gear case acting as a driving member and provided with a planet gear mechanism and a second case acting as a driven member co-acting with the internal gear case and provided with a planet gear mechanism.

A still further object of the invention is the provision of a power transmission device which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 3, is a longitudinal sectional view of the transmission device.

Fig. 7, is an end elevation thereof looking in the direction of the arrow in Fig. 6.

Figure 1:
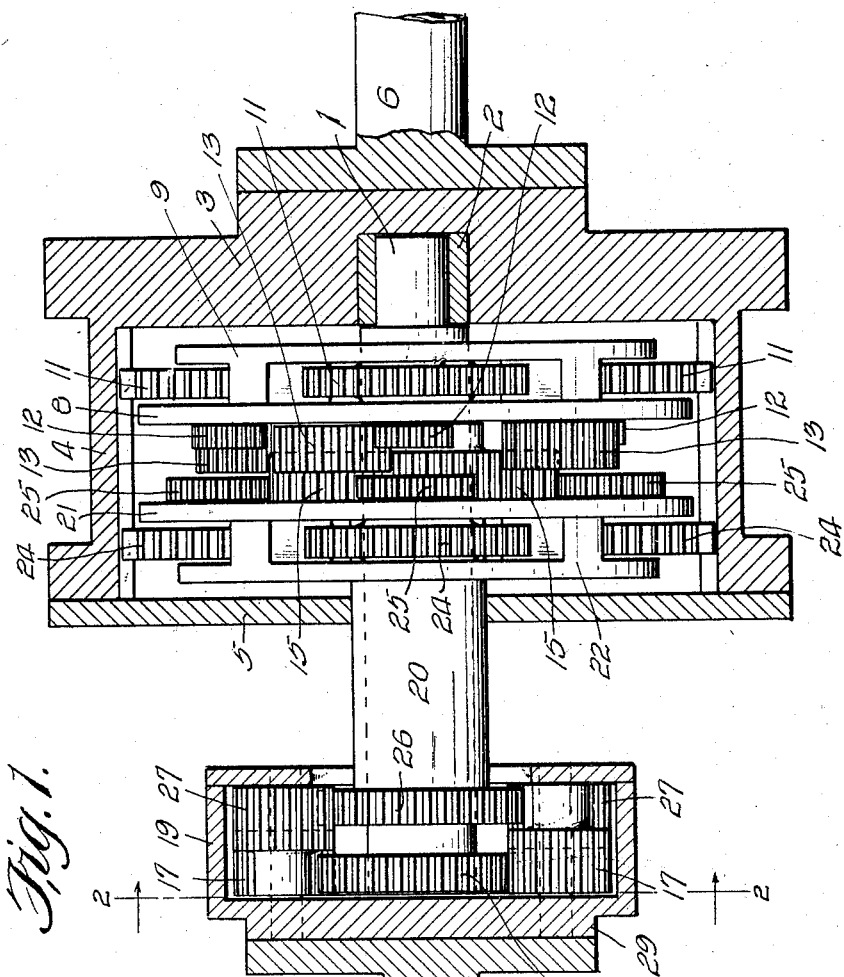
Fig. 1, is a view of the driving and driven members in sectional elevation with their associating parts shown in side elevation.
Figure 2:
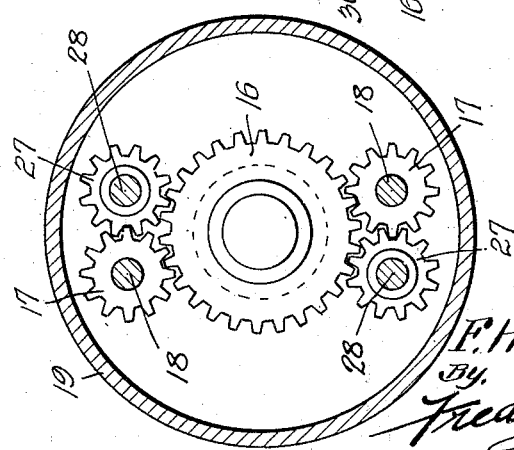
Fig. 2, is a sectional elevation of the driven member, taken on line 2—2 of Fig. 1.

Referring to the drawings, the reference character 1 represents a supporting shaft, one end of which is supported in a suitable bearing 2 carried by the end wall 3 of a suitable internal gear 4. The opposite end of the internal gear is closed by means of an end plate 5, thus the internal gear 4 also acts as, or constitutes a case which is to be revolved by means of a suitable driven shaft 6, such as the crank shaft of an engine, a line shaft, or if desired it can be connected to a clutch member, or other revoluble member, as is manifest.

Figure 5:
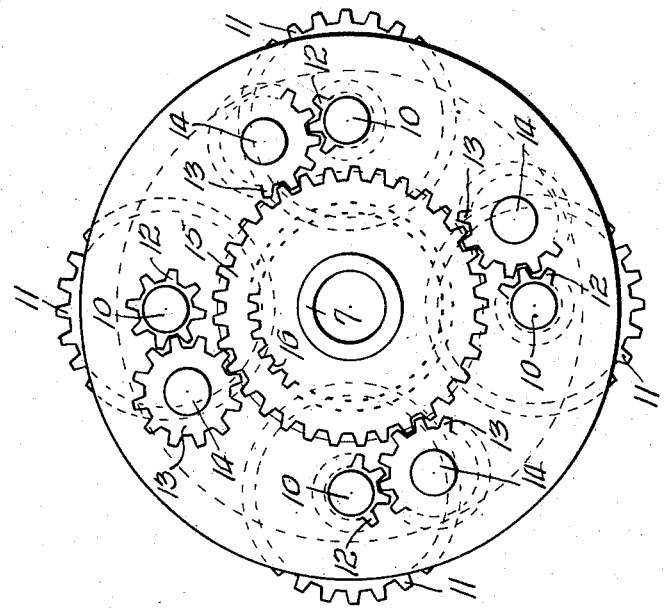
Fig. 5, is an end elevation thereof, looking in the direction of the arrow in Fig. 4.
Figure 4:
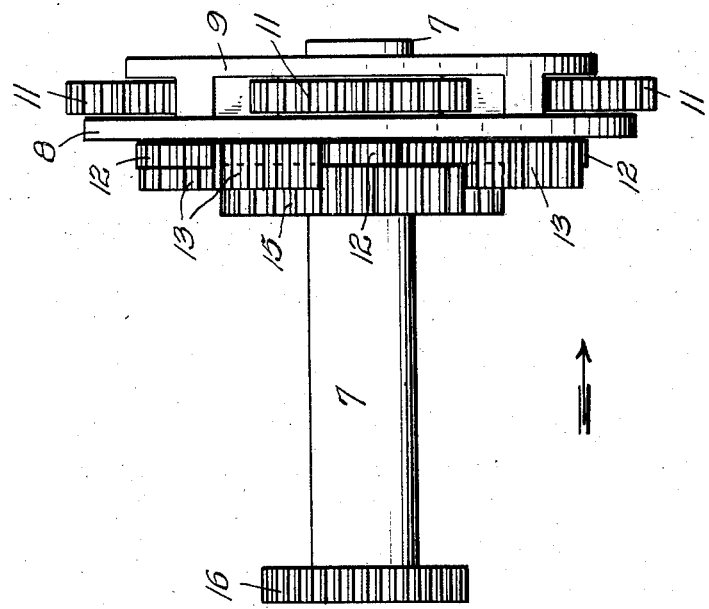
Fig. 4, is a side elevation of one of the planetary gear units.
Figure 1:
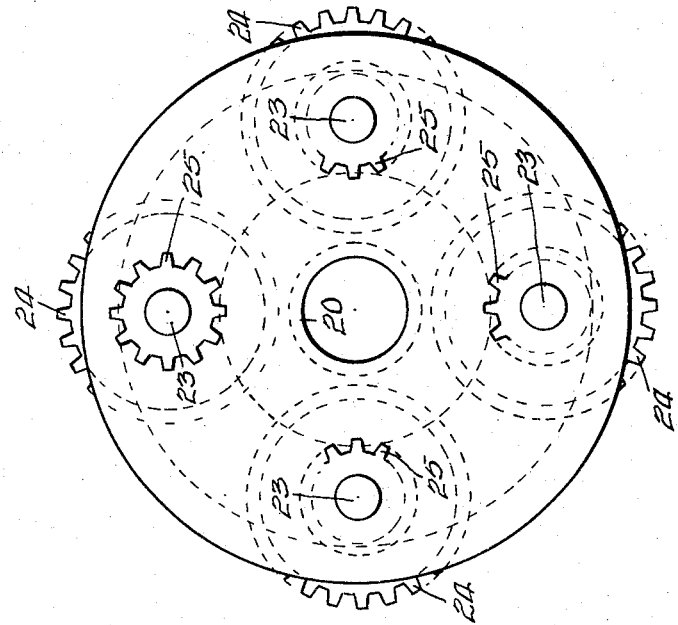
Figure 6:
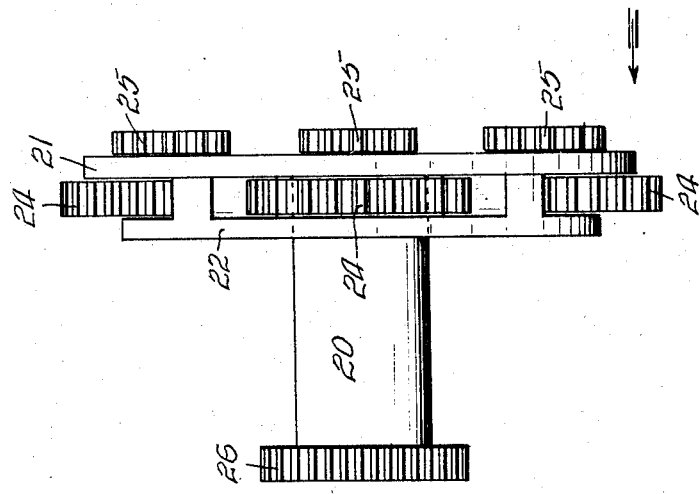
Fig. 6, is a side elevation of a second planetary gear unit.

Mounted to revolve upon the central, or supporting shaft 1, which is disposed partly within and partly without the internal gear case 4, is a sleeve 7, which sleeve is provided near its inner end with a suitable plate 8 concentrically fixed thereto and disposed within the internal gear 4. The plate 8 is provided upon one side with a suitable ring like bearing member 9 which is fixed thereto in suitable spaced relation therewith. The plate 8 and ring like bearing member 9 are provided with a plurality of equally spaced rotatable shafts 10 and to each of said shafts a suitable planet gear 11 is fixed for meshing engagement with the internal gear 4. The equal spacing of the planet gears 11, as shown in Fig. 5, tends to balance the plate 8, as is manifest. The inner end of each planet gear shaft 10 is provided with a pinion gear 12, each of which gears is adapted to mesh with a suitable intermediate gear 13. Each of the intermediate gears 13 is mounted upon a separate shaft 14 carried by the plate 8 and these intermediate gears 13 are adapted to mesh with a suitable gear 15 rotatably mounted upon the sleeve 7 to the inner side of the plate 8, as clearly shown in Figs. 3 and 5.

The outer end of the sleeve 7 is provided with a suitable gear 16 which is fixed thereto, and which is adapted to mesh with a pair of diagonally disposed planet gears 17 mounted upon the shafts 18 which are carried by the end walls of the casing 19.

Mounted to revolve upon the sleeve 7 is a sleeve 20, which is shorter than sleeve 7 and which is provided at its inner end with a suitable plate 21 concentrically fixed thereto and disposed within the internal gear 4. Plate 21 is provided upon one side with a suitable ring like bearing member 22 which is fixed thereto in suitable spaced relation therewith. The plate 21 and ring like bearing member 22 are provided with a plurality of equally spaced rotatable shafts 23 and to each of said shafts a suitable planet gear 24 is fixed for meshing engagement with the internal gear 4. The equal spacing of the planet gears 24, as shown in Fig. 7, tends to balance the plate 21, the same as the planet gears 11 tend to balance the plate 8. The planet gears 24 are of the same diameter as the planet gears 11 and are spaced the same distance apart as the planet gears 11. The inner end of each planet gear shaft 23 is provided with a suitable fixed gear 25, each of which gears 25 mesh with the gear 15 which is rotatably mounted upon the sleeve 7, as clearly shown in Fig. 3.

The outer end of the sleeve 20 is provided with a gear 26 which is fixed thereto and which is adapted to mesh with a pair of diagonally disposed planet gears 27 mounted upon the shafts 28 carried by the end walls of the casing 19, and which planet gears are in mesh with the planet gears 17 disposed within the casing 19.

The driven planetary gear casing 19 is provided with means 29 to which is suitably connected a driven shaft 30, such as connecting the present gear shaft transmission with the differential gearing of a motor vehicle, or any other type of driven shaft. It is here evident that the casing 19 could act, if desired, as a belt pulley, or could be applied to a pulley, or it could be provided with a gear for meshing with another gear.

The operation of the device is as follows:

The internal gear 4 being fixed to a suitable driven member, such as 6, or its equivalent, and rotatable therewith, it is evident that it must revolve at the same speed as the driven member. The rotation of the internal gear 4 sets up a rotary motion to the plates 8 and 21 through the medium of the planet gears 11 and 24, respectively, and due to the intermediate gear connection of the plates 8 and 21 with the loosely mounted gear 15 of sleeve 7, one of the plates is caused to revolve in one direction, while the other plate is caused to revolve in the opposite direction. One of the plates revolves slower than the other, due to the gear connections hereinbefore described. It is evident, however, that one of the plates revolves in the same direction as the internal gear 4, with the internal gear running, however, in advance of said plate, while the other plate revolves in the opposite direction of the internal gear 4.

In operation:

When internal gear 4 is rotated, there is an effort to revolve gears 11 and 24. Atttached to and turning with gears 11 are pinions 12, meshing with idler pinions 13, which in their turn mesh with idler gear 15. The turning effort on idler gear 15 from gears 11 is therefore in the same direction as the direction of rotation of gears 11 themselves. Attached to and turning with gears 24 are pinions 25, which mesh directly with idler gear 15. The turning effort of idler gear 15 from gear 24 is therefore in a direction opposite to the direction of gears 24. Pinions 12 are of smaller diameter than pinions 25. Hence there is a greater tooth pressure exerted by pinion teeth 12 than by pinion teeth 25 as transmitted from internal gear 4.

Gears 11 and pinions 12 are mounted on shaft rigidly attached to plate 8 of sleeve 7, on the end of which is rigidly mounted gear 16. Similarly, gears 24 and pinion 25 are mounted on plate 21 of sleeve 20, on the end of which is rigidly mounted gear 26. Gears 16 and 26 mesh with pinions 17 and 27 respectively, these pinions meshing with one another and revolving on shaft 28 rigidly attached to case 19, to which is rigidly attached the driven member. The load to be overcome through the driven member is therefore transmitted through shaft 28, through pinions 17 and 27, through gears 16 and 26, through sleeves 7 and 20 and disks 8 and 21, through gears 11 and 24, to internal gear 4. Were no resistance exerted on disks 8 and 21, due to greater tooth pressure transmitted from pinions 13 to idler gear 15, disk 8 would remain stationary and idler gear 15 as well as disk 21 rotate at a speed proportionate to the ratio of the train of gears and in the same direction of rotation as that of internal gear 4. With sleeve 20 revolves gear 26, driving pinions 27 which in turn drive pinions 17 meshing with gear 16 on sleeve 7. The entire driving force would therefore be transmitted to pinions 17 and 27. However, due to the load resistance on driven member, the driven torque is transmitted through shaft 28 and pinions 17 and 27 to both disks 8 and 21 through gears 16 and 26 and sleeves 7 and 20 respectively. The driving torque as transmitted to gear 26 is therefore counteracted by the driven torque against pinions 27. If this driven torque is larger than the driving torque, the difference in torque will then transmit itself to gear 16 through pinion 17, causing disk 8 to revolve in an opposite direction. As the two torques equalize, both disks 8 and 21 gradually slow down in their respective speeds and finally become stationary in relation to internal gear 4 and revolve as units with gear 4. Thus the driven member turns with the speed of the driving member and a direct drive is effected. If at any time, the driven torque becomes too great for the driving torque, the tooth pressure between pinions 17 and gear 16 become greater than those between pinions 27 and gear 26, and disks 8 and 21 commence to rotate inside of the internal gear case, the former in the same direction as the internal gear, the latter in the opposite direction. The greater the difference between driving and driven torque, the greater is the differential in speeds between gears 11 and 24.

It is evident that a transmission, such as hereindescribed will eliminate the necessity of a shifting lever, such as employed with the present types of automobile transmission, that the power applied to the driven member is progressive and dependent upon the speed of the driving member, thus eliminating jerks, the danger of stripping gears, and will provide a variable speed control device which is wholly automatic as to speed regulation of the driven member and which is equivalent to the results that hydraulic transmissions are designed to attain.

The many advantages of the herein described invention will readily suggest themselves to those skilled in the art to which it appertains.

I do not wish to be understood as having limited myself to the exact details of construction shown and described, but desire to have it understood that the invention I have shown is merely illustrative, as it is manifest that various minor changes may be made in the exact construction, arrangement and combination of parts without departing from the spirit of my invention, hence I reserve the right to make any such changes, or modifications as may fairly fall within the scope of the appended claims when fairly construed.

What I claim is:

1. A variable speed transmission comprising a revoluble internal gear, a pair of revoluble internal plates, planet gears supported by said plates and connecting the plates with the internal gear, a single loosely mounted gear disposed within the internal gear, gears connecting the planet gears with said loosely mounted gear to revolve the plates in opposite directions, a sleeve extending from each plate, a gear fixed to each plate, a hollow driven element and intermeshing planet gears carried within said hollow driven element and meshing with the gears fixed to said sleeves.

2. A gear transmission comprising a central shaft, a sleeve mounted on said shaft, a sleeve mounted on said sleeve, a gear loosely mounted on said first mentioned sleeve, a plate fixed to each sleeve, a revoluble internal gear enclosing said plates, a plurality of spindles revolubly supported by each plate, a planet gear fixed to each spindle and meshing with the internal gear, a gear fixed to each spindle supported by one of the plates, gear connections between each spindle and said loosely mounted gear for revolving the plates in opposite direction upon rotation of the internal gear, a gear fixed to each sleeve, a driven casing, a pair of planet gears revolubly supported within the casing meshing with the gear fixed to the first mentioned sleeve and a pair of planet gears revolubly supported within the casing meshing with the first mentioned planet gears within the casing and also in mesh with the gear fixed to the sleeve mounted upon the aforesaid first mentioned sleeve.

3. In a gear transmission structure, a pair of hollow shafts one mounted upon the other, a plate fixed to each hollow shaft in spaced relation, a gear loosely mounted upon one of the hollow shafts and disposed between the plates, a driven internal gear enclosing said plates, a plurality of planet gears revolubly supported by each plate meshing with the internal gear and gear connections with the loosely mounted gear for revolving the plates in opposite directions.

4. In a gear transmission structure, a pair of hollow shafts one mounted upon the other, a plate fixed to each hollow shaft in spaced relation, a gear loosely mounted upon one of the hollow shafts and disposed between the plates, a driven internal gear enclosing said plates, a plurality of planet gears revolubly supported by each plate meshing with the internal gear and gear connections with the loosely mounted gear for revolving the plates in opposite directions, a gear fixed to each hollow shaft, a casing housing said gears and planet gears revolubly supported within the casing meshing with the gears fixed to the hollow shafts and with each other.

5. A planetary gear transmission for connecting a driving member with a driven member without the use of a shifting lever consisting of a driven internal gear, a pair of hollow shafts, one mounted upon the other, a gear loosely mounted upon one of said shafts, a compensating gear arrangement connecting each shaft with the internal gear and with the loosely mounted gear, said shafts being revoluble in opposite directions and a compensating gear arrangement carried partly by the driven member and by the hollow shafts.

6. In a transmission structure, a driving member having internal gear teeth, a planetary gear unit revolved by said driving member, a second planetary gear unit revolved by said driving member in the opposite direction to that of the first mentioned planetary gear unit, a loosely mounted gear having connection with both planetary gear units, a driven member, planetary gears carried by said driven member and a gear connection between each planetary gear unit and certain of the planetary gears of the driven member.

7. A variable speed transmission comprising an internal gear fixed to revolve with a driving shaft, a supporting shaft, a sleeve rotatably mounted upon said shaft, a plate fixed to said sleeve, a plurality of planet gears revolubly supported by said plate and in mesh with the internal gear, a gear loosely mounted upon said sleeve, a pair of meshing gears connecting each planet gear with the loosely mounted gear, a sleeve mounted upon said first mentioned sleeve, a plate fixed to said sleeve, a plurality of planet gears revolubly supported by said second plate, a meshing gear connecting each planet gear of said second plate with the loosely mounted gear, the planet gears of each plate being revolved by the internal gear so as to revolve the plates in opposite directions, a driven member, two pairs of diagonally arranged planet gears revolubly supported within the driven member, and a gear fixed to each sleeve and each in mesh with a pair of said planet gears.

8. A gearing arrangement for transmissions comprising a driving member in the form of an internal gear a series of gears revoluble in an orbital path within the internal gear certain of which gears mesh with the internal gear, carrier members for said gears, telescoped tubular shafts for supporting said carrier members, a final driven member including a plurality of gears and a carrier member therefor, a gear fixed to each tubular shaft meshing with the gears of the final driven member and a gear loosely mounted upon one of the tubular shafts and meshing with certain of the series of gears supported by the carrier members which do not mesh with the internal gear.

9. In a power transmission structure, a front differential unit, a rear differential unit, said front differential unit including an internal gear, a carrier including a sleeve, a plurality of gears rotatably supported by the carrier adapted to mesh with the internal gear, a gear loosely mounted on said sleeve, a train of gears connecting said loosely mounted gear with the first mentioned gears, a second carrier including a sleeve mounted upon said first mentioned sleeve, a plurality of gears rotatably supported by the second carrier adapted to mesh with the internal gear and a plurality of gears connecting said last mentioned gears and meshing with said loosely mounted gear and said rear differential unit including two pair of opposed gears, means rotatably supporting said gears and a gear fixed to each sleeve and each gear in mesh with one pair of said two pair of opposed gears.

10. In a transmission structure, an internal gear adapted to be connected to a suitable source of power, a carrier, a sleeve connected centrally of said carrier and directed therefrom, a plurality of gears revolubly supported by said carrier adapted to mesh with the internal gear, a plurality of carrier gears revoluble with said first mentioned gears, a gear loosely mounted upon said sleeve, a plurality of idler gears meshing with said carrier gears and with said loosely mounted gear, a second carrier, a sleeve connected centrally of said carrier and mounted upon the sleeve of the first mentioned carrier, a plurality of gears revolubly supported by the second carrier adapted to mesh with the internal gear, a plurality of carrier gears revoluble with said last mentioned gears and in mesh with said loosely mounted gear and a rear differential unitedly connected with said sleeves.

In testimony whereof I have hereunto affixed my signature.

FREDERICK H. SANDHERR.